United States Patent
Kumar et al.

(10) Patent No.: US 10,313,178 B2
(45) Date of Patent: Jun. 4, 2019

(54) VIRTUAL NETWORK INTER-CONTAINER COMMUNICATION

(71) Applicant: Equinix, Inc., Redwood City, CA (US)

(72) Inventors: Parveen Kumar, Fremont, CA (US); Venkatachalam Rangasamy, San Jose, CA (US); Jaganathan Jeyapaul, San Jose, CA (US); Brian J. Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 204 days.

(21) Appl. No.: 15/228,471

(22) Filed: Aug. 4, 2016

(65) Prior Publication Data
US 2017/0214550 A1    Jul. 27, 2017

Related U.S. Application Data

(60) Provisional application No. 62/286,259, filed on Jan. 22, 2016, provisional application No. 62/332,385, filed on May 5, 2016.

(51) Int. Cl.
*H04L 12/24* (2006.01)
*H04L 29/08* (2006.01)
(Continued)

(52) U.S. Cl.
CPC ...... *H04L 41/0654* (2013.01); *H04L 12/4679* (2013.01); *H04L 12/4683* (2013.01);
(Continued)

(58) Field of Classification Search
CPC ... G06F 21/10; G06F 8/20; G06F 8/60; G06F 9/45533; G06F 9/4881; G06Q 10/0631;
H04L 41/00; H04L 47/70; H04L 49/25; H04L 63/0815; H04L 67/10; H04L 67/141; H04L 12/4679; H04L 12/4683; H04L 41/0654; H04L 41/5045; H04L 43/0817; H04L 43/10; H04L 45/021; H04L 61/15; H04L 61/3015; H04L 67/02; H04L 67/1095; H04L 67/1097; H04L 67/16; H04L 69/40
See application file for complete search history.

(56) References Cited

U.S. PATENT DOCUMENTS 9,690,622 B1 * 6/2017 Argenti ................. G06F 9/4881
2004/0003035 A1   1/2004 Sesek
(Continued)

OTHER PUBLICATIONS

International Search Report and Written Opinion of International Application No. PCT/US2016/1669626, dated May 4, 2017, 15 pp.
(Continued)

*Primary Examiner* — Le H Luu
(74) *Attorney, Agent, or Firm* — Shumaker & Sieffert, P.A.

(57) ABSTRACT

Techniques are disclosed for facilitating inter-container communications, via a cloud exchange, for containers executing at logically isolated networks. In one example, the techniques of the disclosure provide a method including sending, by a container to a cloud exchange via an application programming interface exposed by an interconnection platform of the cloud exchange, container registration data for the container, the container registration data including a network address for a host that executes the container and a container identifier for the container.

28 Claims, 9 Drawing Sheets

(51) Int. Cl.
  *H04L 12/755* (2013.01)
  *H04L 29/14* (2006.01)
  *H04L 12/46* (2006.01)
  *H04L 29/12* (2006.01)
  *H04L 12/26* (2006.01)

(52) U.S. Cl.
  CPC ...... *H04L 41/5045* (2013.01); *H04L 43/0817* (2013.01); *H04L 43/10* (2013.01); *H04L 45/021* (2013.01); *H04L 61/3015* (2013.01); *H04L 67/02* (2013.01); *H04L 67/10* (2013.01); *H04L 67/1095* (2013.01); *H04L 67/1097* (2013.01); *H04L 67/16* (2013.01); *H04L 69/40* (2013.01); *H04L 61/15* (2013.01)

(56) References Cited

U.S. PATENT DOCUMENTS

| | | | |
|---|---|---|---|
| 2010/0191851 A1 | 7/2010 | Raja et al. | |
| 2012/0030672 A1* | 2/2012 | Zygmuntowicz | G06F 8/60 718/1 |
| 2012/0054367 A1 | 3/2012 | Ramakrishnan et al. | |
| 2013/0268643 A1 | 10/2013 | Chang et al. | |
| 2013/0297662 A1* | 11/2013 | Sharma | H04L 63/0815 707/827 |
| 2014/0075243 A1 | 3/2014 | Nagaraj | |
| 2014/0130038 A1* | 5/2014 | Lucovsky | G06F 9/45533 717/176 |
| 2014/0201218 A1* | 7/2014 | Catalano | G06Q 10/0631 707/748 |
| 2014/0337528 A1* | 11/2014 | Barton | H04L 41/00 709/225 |
| 2014/0366155 A1* | 12/2014 | Chang | G06F 21/10 726/27 |
| 2015/0156251 A1* | 6/2015 | Zhou | H04L 67/10 709/203 |
| 2015/0326648 A1 | 11/2015 | Diwakar | |
| 2016/0088092 A1* | 3/2016 | Cardona-Gonzalez | H04L 67/141 709/227 |
| 2016/0127454 A1* | 5/2016 | Maheshwari | H04L 47/70 709/223 |
| 2016/0330138 A1 | 11/2016 | Thomason | |
| 2016/0337474 A1* | 11/2016 | Rao | H04L 49/25 |
| 2016/0350105 A1* | 12/2016 | Kumar | G06F 8/20 |
| 2017/0118042 A1 | 4/2017 | Bhattacharya et al. | |
| 2017/0147324 A1 | 5/2017 | Weber et al. | |

OTHER PUBLICATIONS

U.S. Appl. No. 14/927,306, by Parveen Kumar, et al., filed Oct. 29, 2015.

Grattafiori, "Understanding and Hardening Linux Containers," NCC Group Whitepaper, Version 1.0, Apr. 20, 2016, 122 pp.

"Docker Overview," Docker, Inc., retrieved from docs.docker.com/engine/understanding-docker, Jul. 9, 2016, 10 pp.

Tarazi, "Everyone is Talking About Docker Containers," The Equinix Blog, Dec. 3, 2014, 2 pp.

Koty et al., "Software Engineering Innovation at Equinix: A Cultural Shift," The Equinix Blog, Sep. 23, 2015, 10 pp.

Invitation to Restrict or Pay Additional Fees from International Application No. PCT/US2016/69626, dated Mar. 7, 2017, 2 pp.

International Preliminary Report on Patentability from International Application No. PCT/US2016/069626, dated Aug. 2, 2018, 12 pp.

* cited by examiner

VIRTUAL NETWORK INTER-CONTAINER COMMUNICATION

This application claims the benefit of U.S. Application No. 62/286,259 filed on Jan. 22, 2016 and U.S. App. No. 62/332,385 filed on May 5, 2016, the entire contents of which are incorporated herein by reference.

TECHNICAL FIELD

The disclosure relates to computer networks and, more specifically, to a platform facilitating interconnectivity among cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers (CSPs) manage a public, private, or hybrid cloud to facilitate the online delivery of cloud services to one or more cloud customers.

A cloud exchange may allow private networks of a customer of the cloud exchange to be interconnected to any other customer of the cloud exchange at a common point, thereby allowing direct exchange of network traffic between the networks of the customers. Customers may include network carriers (or network service providers), enterprises, and other users of cloud services offered by one or more CSPs. One example use of a cloud exchange is to interface a group of customers to a group of CSPs. Each CSP may provide customer access to a "cloud" computing network, wherein the customer stores, manages, and processes data on a network of remote servers rather than on the local server or personal computer of the customer.

SUMMARY

In general, the disclosure describes techniques for facilitating inter-container communications, via a cloud exchange, for containers executing at logically isolated networks. For example, a cloud exchange may provide connectivity between an enterprise network that executes one or more applications (e.g., micro-services) using containers and a cloud service provider network that also executes one or more applications using containers. By extending the containers to register and communicate with the cloud exchange and to communicate with one another via the cloud exchange-provisioned connectivity, the techniques may not only facilitate communications between containers but also in some cases provide the cloud exchange with increased control over container operations and deployment to enhance the quality of customer services.

The techniques may provide one or more advantages. For instance, a cloud exchange provider may leverage the techniques to provide, via a cloud exchange, a backup service to an enterprise customer that executes applications using containers on its enterprise network. The enterprise customer may purchase cloud-based resources from a CSP for executing container-based applications deployed to the CSP by the enterprise. The cloud exchange may provision connectivity between containers executing at the enterprise network and containers executing at the CSP. In addition, using information obtained from the containers executing at the CSP and the enterprise network, the cloud exchange may associate a primary container executing at the enterprise network and a secondary container executing at the CSP and direct the containers to exchange communications for backup purposes. For instance, the primary container may periodically ping the secondary container via the cloud exchange to determine the secondary container is operational for executing a deployed application. In the event of a failure of the primary container application, overload of the primary container application, or other triggering event, the primary container may redirect application loads to the secondary container executing at the CSP. In this way, the cloud exchange facilitates seamless application replication and backup services to the cloud.

As another example, the cloud exchange provider may leverage the techniques to provide, via the cloud exchange, a disaster recovery or other replication service to an enterprise customer that executes applications using containers on its enterprise network. Because containers executing at different CSPs are isolated from one another, they are unable to exchange data. The cloud exchange may provision connectivity between the different CSPs to enable inter-container communications between respective containers executing at the different CSPs. If a container fails (e.g., by suffering a connection problem or a software bug), the cloud exchange may switch the customer from a primary container executing at a first CSP to a secondary container executing at a second CSP so that the customer may continue to access the application. In a further example, a CSP itself may desire to manage the usage of network resources, and selectively provision or de-provision containers to manage the load on the network. In a further example, a customer may desire to share files or information between two cloud services to which he subscribes, which may require the cloud exchange to pass information from a first application within a first container in a first cloud to a second application within a second container in a second cloud, for example.

In one example, this disclosure describes a method including: sending, by a container to a cloud exchange via an application programming interface exposed by an interconnection platform of the cloud exchange, container registration data for the container, the container registration data including a network address for a host that executes the container and a container identifier for the container.

In another example, this disclosure describes a method including: receiving, by a cloud exchange from a container executing at a private network coupled to the cloud exchange, container registration data for the container, the container registration data including a network address for a host that executes the container and a container identifier for the container; and storing, by the cloud exchange, the container registration data.

In another example, this disclosure describes a computing device including: at least one processor operably coupled to a memory; a kernel configured for execution by the at least one processor; and a container configured to execute by the kernel, wherein the container includes a network module configured to output container registration data to a cloud exchange via an application programming interface exposed by an interconnection platform of the cloud exchange, the container registration data including a network address for a host that executes the container and a container identifier for the container.

In another example, this disclosure describes a cloud exchange including: a network; and an interconnection platform configured to configure the network to interconnect a plurality of private networks, wherein the cloud exchange is configured to receive, from a container executing at a private network of the plurality of private networks and via the interconnection platform, container registration data for the container, the container registration data including a network address for a host that executes the container and a container identifier for the container.

In another example, this disclosure describes a method including: transmitting, by a first container of a first private network of a plurality of private networks coupled to a cloud exchange and to a router of the cloud exchange, a first data communication to request an indication of a health of a second container of a second private network of the plurality of private networks coupled to the cloud exchange; and receiving, by the first container and from the router, a second data communication originated by a second container of a second private network of the plurality of private networks coupled to the cloud exchange, the second data communication indicating the health of the second container.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

In general, the disclosure describes techniques for facilitating inter-container communications and container deployment and operations control, via a cloud exchange, for containers executing at logically isolated networks. For example, techniques are described for creating a virtual private network to allow virtualized containers within a first CSP connected to a cloud-based services exchange, or "cloud exchange," to transparently communicate with virtualized containers within a second CSP connected to the cloud exchange.

Figure 1:
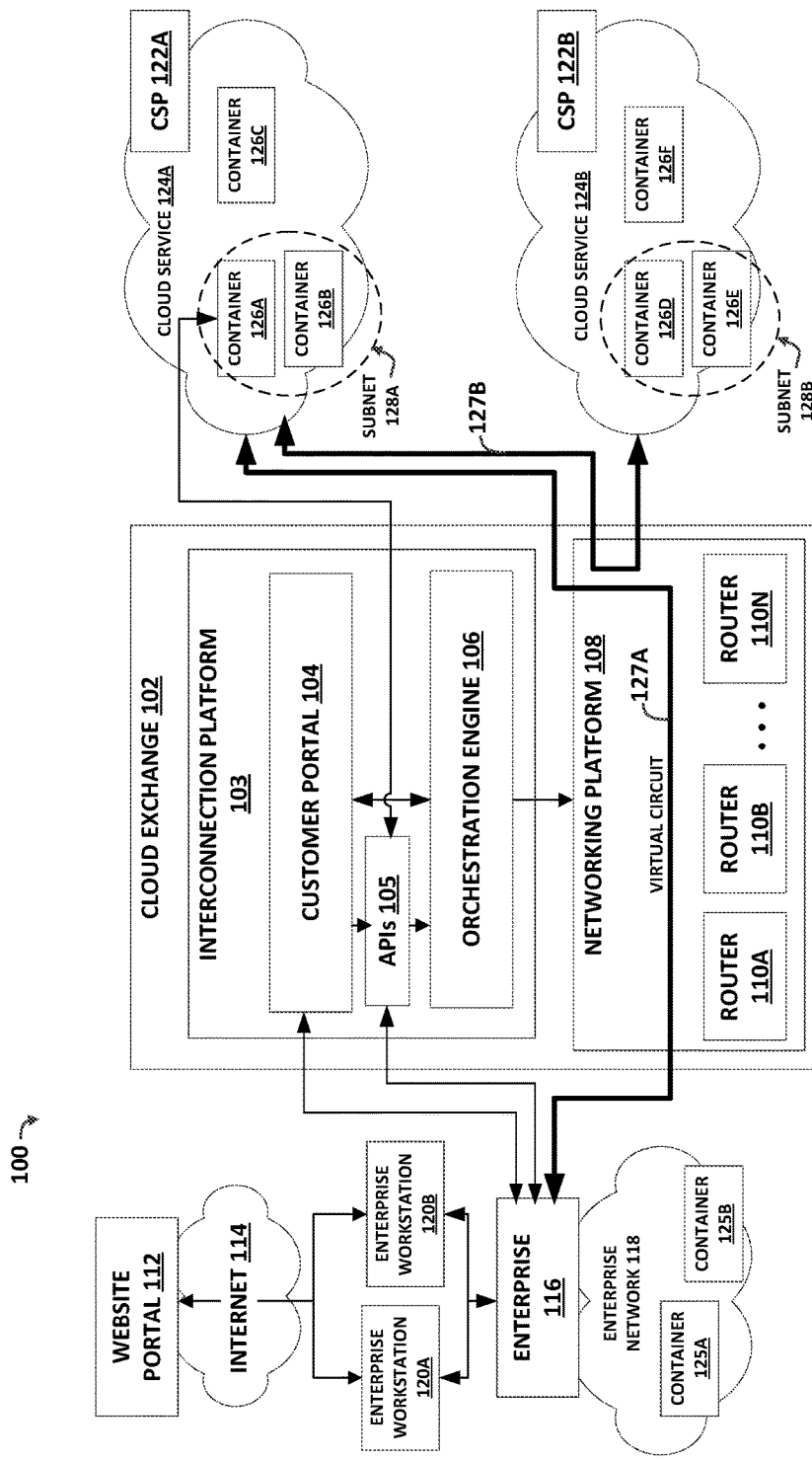
FIG. 1 is a block diagram illustrating an example network according to the techniques of the disclosure.

FIG. 1 is a block diagram illustrating an example system according to the techniques of the disclosure. A cloud exchange may facilitate virtual connections for cloud services delivery from multiple cloud service providers to one or more cloud customers. The cloud exchange may enable cloud customers to bypass the public Internet to directly connect to cloud services providers so as to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network. Cloud exchange 102 may interface enterprise 116 to a plurality of cloud services 124A-124B (collectively, "cloud services 124") provided by CSPs 122A-122B. As one example of a cloud exchange, an Equinix Cloud Exchange (ECX) may interface a plurality of cloud service consumers/customers (e.g., enterprises, organizations, and individuals) to a plurality of CSPs (e.g., such as Microsoft Azure and Amazon Webservices). Cloud exchange 102 may provide one or more interconnections for cloud services delivery from the multiple CSPs 122 to enterprise 116, as well as interconnections between the multiple CSPs 122. An interconnection may represent a physical cross-connect or a virtual circuit. Additional details of interconnecting networks via a cloud exchange are found in U.S. Provisional Application No. 62/072,976 and U.S. patent application Ser. No. 14/927,306, the contents of which are hereby incorporated by reference herein.

A CSP may provide a virtual machine hypervisor (VM) to a customer for access to the cloud network. A VM emulates virtual hardware. In other words, each VM provides a virtualized operating system and application suite for customer access. Because the VM is virtualized, the customer and his applications are isolated from both the hardware of the host and the VMs of other customers. This allows the CSP to provide cloud services that are safe and secure to the customer. The CSP may implement dozens or hundreds of VMs on a single network for access by a group of customers. However, because each VM virtualizes a complete operating system, it may consume a large amount of network resources.

A more efficient alternative to a virtual machine is a virtualized container, such as provided by the open-source Docker Container application. Like a VM, each container is virtualized and may remain isolated from the host machine and other containers. However, unlike a VM, each container may omit an individual operating system and provide only an application suite and application-specific libraries. Each container is executed by the host machine as an isolated user-space instance and may share an operating system and common libraries with other containers executing on the host machine. Thus, a cloud network using containers may require much less processing power, storage, and network resources than a cloud network implementing VMs. As used herein, containers may also be referred to as virtualization engines, virtual private servers, silos, or jails.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine. Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016; and in Aaron Grattafiori, "Understanding and Hardening Linux Containers," NCC Group, Apr. 20, 2016; each of which are incorporated by reference herein in their entireties.

Enterprise 116 deploys an enterprise network 118, such as an enterprise on-premises data center or private cloud, to execute containers 125A, 125B that provide an operating environment for applications deployed by enterprise 116. In some cases, applications executed by containers 125A, 125B may be microservices. In general, microservices each implement a set of focused and distinct features or functions, and a microservice conforms to (or is usable in) an architectural pattern in which many dozens or even hundreds of microservices can be independently developed and deployed. Microservices may be organized around a business capability and may implement a "broad-stack" of software for the business capability, including persistent storage and any external collaboration. The various microservices expose interfaces that enable the microservices to invoke one another to exchange data and perform the respective sets of functions in order to create one or more overall applications. Each of the microservices may adhere to a well-defined Application Programming Interface (API) and may be orchestrated by invoking the API of the microservice. Each of the microservices executes independently and exposes an interface for asynchronous invocation with respect to the other microservices.

Via cloud exchange 102, CSPs 122A-122B may make available cloud services 124A-124B, respectively, to enterprise 116 to provide execution environments for enterprise 116 applications. In the illustrated example, each cloud service 124 may comprise a plurality of containers 126 that each provides an execution environment for at least one application (e.g., microservice) deployed by enterprise 116. For example, cloud service 124A may comprise containers 126A, 126B, and 126C, cloud service 124B may comprise containers 126D, 126E, and 126F, and cloud service 124A may comprise containers 126G, 126H, and 126J. Further, a cloud service may group a plurality of containers into network subnets for organizational and network addressing purposes. In the example of FIG. 1, containers 126A and 126B may be grouped into subnet 128A, while containers 126D and 126E are grouped into subnet 128B. Containers 126A and 126B of subnet 128A may execute on the same or on different hosts, the one or more hosts being addressable by a network address that is a member of subnet 128A. In one example, a plurality of containers may be grouped into a plurality of subnets to organize services into different subnets. In another example, a plurality of containers may be grouped into a plurality of subnets to divide containers amongst customers of the cloud service.

Cloud exchange 102 includes an interconnection platform 103 that may expose a collection of software interfaces, also referred to herein and described as application programming interfaces (APIs) 105, which may allow access to capabilities and assets of the interconnection platform in a programmable fashion. The APIs 105 may provide an extensible framework that allows software developers associated with customers and partners of the exchange to build software applications that access the interconnection platform that automatically manages interconnection with multiple cloud service providers participating in the interconnection platform, to provide interconnection and other services described herein to customers of the cloud exchange 102 provider. Developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers.

These software interfaces defined by the APIs 105 enable machine-to-machine communication for near real-time setup and modifications of interconnections, and facilitating inter-container communications and container control as described herein, and may also eliminate or reduce the need for human interaction for the entire interconnection setup and management process. In this way, the software interfaces provide an automated and seamless way to use and manage containers executing at multiple different network connected to cloud exchange 102.

Enterprise 116 may interface a plurality of enterprise workstations 120A-120B (collectively, "enterprise workstations 120") of enterprise 116 to networks outside of enterprise 116. Enterprise 116 may interface enterprise workstations 120 to websites connected to the Internet 114, for example, website portal 112, which may provide enterprise workstations 120 with access to the website of a CSP. Further, enterprise 116 may interface enterprise workstations 120 to cloud exchange 102. As used herein, actions imputed to enterprise 116, cloud exchange 102, or CSPs 122 may refer to a human operator or automated agent directed by the enterprise 116, cloud exchange 102, or CSP 122.

Enterprise workstations 120 may access Customer Portal ("Customer Portal") 104 to log into to cloud exchange 102. Customer Portal 104 may represent a web-based application exposed to customers via a website and accessible using a browser. Customers may use Customer Portal 104 to sign up for or register cloud services. After a customer has registered, he may receive a service license identifier (e.g., a registration key). The service license identifier may identify the customer, the type of customer (e.g., business or individual), the services the customer has access to (e.g., Microsoft Azure or Amazon Webservices), and service parameters such as an amount of service purchased in terms of, e.g., cloud service provider resources (bandwidth, processing units, and so forth).

In some examples, the interconnection platform 103 may conform to a microservice-based application architecture and include an internal orchestration engine 106 that organizes, directs and integrates underlying microservices, as well as other software and network sub-systems, for managing various service provided by the cloud exchange 102.

Orchestration engine 106 of the interconnection platform 103 for cloud exchange 102 may facilitate the dynamic creation of private connections between enterprise 116 and any of CSPs 122A-122B, as well as between CSPs 122A-122B, cloud service customers, network service providers, a cloud exchange administrator, or other customers of the cloud exchange. Orchestration engine 106 may receive registration information and service license identifiers from Customer Portal 104 obtained from users at registration. The orchestration framework may use this information to coordinate interactions between a heterogeneous set of unrelated APIs, microservices, Web services, sockets, remote method invocations (RMIs), and the like, that are orchestrated through a workflow, to seamlessly create a private connection between the enterprise and the multiple cloud service providers. The orchestration engine may be responsible for handling the entire request, which may be received from various channels such as a web portal and an API. Specific techniques for the design and implementation of an orchestration engine are described in U.S. Provisional Application No. 62/072,976 and U.S. patent application Ser. No. 14/927,306, incorporated above.

Networking platform 108 may comprise a plurality of routers and switches 110A-110N (collectively, "routers 110"), where "N" represents a number of routers and switches. Networking platform 108 may use routers 110 to transfer data between and amongst enterprise 116 and cloud services 124A-124B. Orchestration engine may administer the operations of networking platform 108 to facilitate the dynamic creation of private connections between enterprise 116 and cloud services 124A-124B. In the example of FIG. 1, Orchestration engine may provision a virtual circuit 127A in the form of a virtual local area network (VLAN)-based or IP-VPN-based connection, for instance, between enterprise 116 and networking platform 108 to allow for data transfer between enterprise 116 CSP 122A. Similarly, orchestration engine 106 may provision a virtual circuit 127B to interconnect the respective networks of CSPs 122A, 122B. Thus, according to the techniques of the disclosure, orchestration engine 106 may act to facilitate secure, fast, and efficient connections among enterprise 116 and cloud service provider 122 networks.

According to the techniques of the disclosure, the cloud exchange 102 may facilitate communications between two containers executing at different networks connected to the cloud exchange. For example, cloud exchange 102 may facilitate communications between container 125A executing at enterprise 116 and container 126A executing at the CSP 122A network providing cloud service 124A. As another example, cloud exchange 102 may facilitate communication between two containers of two different cloud services (e.g., between containers 126A and 126D). To implement communication amongst containers, each container may be given an identifier for identifying the container and a network address for identifying a host executing the container. In one example, container 126A may generate a data communication destined for container 126D, which has a particular container identifier and is executed by a particular host within cloud service 124B. This data communication may be forwarded as L2/L3 traffic by cloud service 124A to routers 110 of networking platform 108. Orchestration engine 106 may coordinate the operations of networking platform 108 such that routers 110 may forward the data communication to cloud service 124B, where it may be directed to the host executing container 126D within cloud service 124B.

Containers 125, 126 may register, via APIs 105, with orchestration engine 106 to provide respective container registration data including, e.g., network data and container identification data. Using the container registration data, orchestration engine 106 may facilitate inter-container communications and, in some instances, a backup service, a disaster recovery service, and/or other services to enterprise 116. For example, orchestration engine 106 may send, to enterprise 116, container registration data obtained from container 126A. Orchestration engine 106, in conjunction with container 126A deployed to cloud service 124A, in this way extends network connectivity from the virtual circuit 127A to the container 126A by enabling enterprise 116 to use the container registration data to directly address and send data to container 126A via virtual circuit 127A through the CSP 122A network that includes container 126A and is coupled to virtual circuit 127A. Likewise, orchestration engine 106 may, using the container registration data, directly address and send data to container 126A via virtual circuit 127A through the CSP 122A network that includes container 126A and is coupled to virtual circuit 127A.

Using the extended network connectivity, the cloud exchange 102 may in some instances facilitate a backup (or replication) service for applications executed by an enterprise 116 using containers 125 on enterprise network 118. For example, the cloud exchange 102 may associate a primary container 125A and a secondary container 126A of cloud service 124A and direct primary container 125A and secondary container 126A to exchange communications for backup purposes. Orchestration engine 106 may provide the container registration data obtained from container 126A to container 125A, and vice-versa. In some instances, enterprise 116 creates the association via customer portal 104, which orchestration engine 106 uses to direct the operations of containers 125, 126. Upon determining that container 125A has failed, enterprise 116 may redirect application traffic from container 125A to container 126A. For example, an API gateway 116 that receives application requests may be configured to redirect application traffic from container 125A to container 126A in response to determining that container 125A has failed.

Using the extended network connectivity, the cloud exchange 102 may in some instances facilitate a disaster recovery service for applications executed by an enterprise 116 using containers 126 deployed to cloud service 124A. For example, the cloud exchange 102 may associate a primary container 126A of cloud service 124A and a secondary container 126D of cloud service 124D for disaster recovery purposes. Orchestration engine 106 may provide the container registration data obtained from container 126A to container 126D, and vice-versa. In some instances, enterprise 116 may select cloud service 124B for the disaster recovery service via customer portal 104, which orchestration engine 106 uses to direct the operations of containers 126A, 126D. In some instances, orchestration engine 106 creates the association between containers 126A, 126D by purchasing cloud service 124B from CSP 122B to obtain access to a computing platform to execute the container 126D. Orchestration engine 106 may copy the state of container 126A to container 126D. Upon determining that container 126A has failed, orchestration engine 106 and/or enterprise 116 may redirect application traffic from container 126A to container 126D. For example, an API gateway 116 that receives application requests may be configured to redirect application traffic from container 126A to container 126D.

In some cases, orchestration engine 106 may persist a state of container 125A or container 126A to a database, e.g., by storing transactions or state data. As part of the backup or disaster recovery service, orchestration engine 106 may push the state to the secondary container (container 126A or container 126D) such that the application executed by the secondary container may be seamlessly transitioned to the role previously performed by the application executed by the primary container. In some cases, orchestration engine 106 may dynamically create virtual circuit 127B from cloud service 124A to cloud service 124B to enable communications between containers executed by cloud service 124A and containers executed by cloud service 124B. Although illustrated as a separate virtual circuit 127B, virtual circuit 127B may represent an extension of virtual circuit 127A (a same VLAN or IP-VPN), thereby enabling to enterprise network 118 to exchange data with cloud service 124B as well as with cloud service 124A.

Enterprise 116 or cloud exchange 102 may determine a health of containers by directly exchanging data with the containers or by directing the containers to communicate with one another. For instance, a primary container may periodically ping (or otherwise exchange data with) a secondary container via the cloud exchange 102 to determine the secondary container is operational for executing a deployed application. As one example, secondary container 126A may periodically ping primary container 125A to determine a health of container 125A, and vice-versa. Alternatively, orchestration engine 106 may directly ping any of containers 125, 126.

In the event of a failure of the primary container application, overload of the primary container application, or other triggering event, application loads are redirected to the secondary container executing at the CSP. In this way, the cloud exchange facilitates seamless application replication and backup services to the cloud. Accordingly, it may be seen that a cloud exchange according to the techniques of this disclosure may allow a private network, such as an enterprise or cloud exchange, to deploy a primary container for executing an application (e.g., a microservice), while maintaining one or more secondary containers as redundant backups to the primary container.

In some examples, enterprise 116 may purchase service licenses for cloud services 124 from CSPs 122. In some examples, each service license may grant enterprise 116 permission to register and deploy a maximum number of containers on the cloud service provided by the CSP. For example, enterprise 116 may purchase a license to deploy fifty containers on cloud service 124A. Similarly, enterprise 116 may purchase a license to deploy twenty containers on cloud service 124B.

A secondary container executing on a cloud service, or cloud exchange 102, may monitor the health of the primary container, and should the primary container become unhealthy, the secondary container or cloud exchange 102 may move customers and their data to the secondary container. In this way, service interruptions to the customer may be reduced. In one example, a secondary container executing in a cloud service may monitor the health of a primary container executing in an enterprise network. In a further example, other containers within a cloud service may monitor the health of a primary container executing in the same cloud service. In a further example, secondary containers within a different cloud service may monitor the health of the primary container executing in a cloud service. In some examples, the health of the primary container may be determined by "pinging" the primary container, or sending an echo request packet to the primary container and measuring the amount of time required to receive an echo reply packet. In this way, the round-trip time for the echo request may be monitored. If no echo reply packet is received, it may be inferred that the primary container is disconnected from the network or not responding to communications. Therefore, the primary container may be deemed unhealthy and one of the plurality of secondary containers may be deployed to maintain service integrity to the customer. In other examples, if the round-trip time of the echo reply packet exceeds a particular amount, it may be inferred that the primary container is overburdened with use, and so multiple secondary containers may be deployed, and at least a portion of customers and their data redirected to the secondary containers, to perform load-balancing over the cloud service. In this way, the cloud service may spread the load across the network and avoid overloading any particular container. Thus, the cloud service may dynamically deploy or undeploy containers to account for the particular load upon the network at any particular time.

Thus it may be seen that a system according to the techniques of the disclosure may allow a container within a first private network to communicate with a container of another private network. Such a system may allow a container to monitor the health of a container on another private network, or to exchange data between microservices executing on containers on the same or different private network. Further, such a system may allow a cloud service to maintain more effective service to their customers by minimizing or remedying interruptions to a microservice provided by a particular container. Further, such a system may allow a cloud service to more effectively perform load balancing of the network, so as to avoid strain on one particular system, which may otherwise cause adverse performance and negatively impact the experience of the customer.

As one illustration of the techniques of the disclosure, an example Application Programming Interface (API) definition is provided for facilitating inter-container communications, via a cloud exchange, for containers executing at logically isolated networks. The following API is an example POST operation that, when executed by orchestration engine 106, provisions the virtual network for containers.

REQUEST:
Request URI:
POST http://<HostName>/ecx/ {version}/overlaynetwork
Filter Parameters:
None
Request Headers:

| Header Attribute | Description |
| --- | --- |
| Authorization | Required. Specifies the Oauth Bearer token |

REQUEST PARAMETERS:

| name_services | |
| --- | --- |
| Description | Connection name |
| Type | String |
| Required | Yes |
| Default | None |
| Example | None | id

| | |
|---|---|
| Description | Connection ID |
| Type | String |
| Required | Yes |
| Default | |
| Example | f7a6ae0574bbf62c42f539b50c8ebde0f728a253b6f | data center port

| | |
|---|---|
| Description | Connection type |
| Type | String |
| Default | None |
| Example | ECX_Docker_Network |
| Required | Yes | subnet

| | |
|---|---|
| Description | Subnet private IP details |
| Type | String |
| Default | None |
| Example | 172.17.0.1/16 |
| Required | No | gateway

| | |
|---|---|
| Description | Gateway private IP details |
| Type | String |
| Default | None |
| Example | 172.17.0.1 |
| Required | no | container_ID

| | |
|---|---|
| Description | Container ID |
| Type | String |
| Required | Yes |
| Default | None |
| Example | 3386a527aa08b37eab05a6b775fba7ddd40d8f92c | container_name

| | |
|---|---|
| Description | Container name |
| Type | String |
| Required | Yes |
| Default | None |
| Example | container1 | provider

| | |
|---|---|
| Description | VLAN (Provider) name [may be expressed as a VLAN identifier/tag] |
| Type | String |
| Required | Yes |
| Default | None |
| Example | Azure Express Route, AWS Direct Connect, Cloud Sigma | speed

| | |
|---|---|
| Description | VLAN or connection speed |
| Type | string |
| Required | Yes |
| Default | None |
| Example | "up to 200, up to 500" | vlan

| | |
|---|---|
| Description | VLAN id for the connection |
| Type | Number |
| Required | Yes |
| Default | None |
| Example | 456 | code

| | |
|---|---|
| Description | Metro Code |
| Type | String |
| Required | Yes |
| Default | None |
| Example | SG | macAddress

| | |
|---|---|
| Description | MAC address |
| Type | sting |
| Required | Yes |
| Default | None |
| Example | 02:42:ac:11:00:02 | port

| | |
|---|---|
| Description | Docker port detail |
| Type | Number |
| Required | Yes |
| Default | None |
| Example | 8082 |

ASN

| | |
|---|---|
| Description | Private ASN detail |
| Type | Number |
| Required | No |
| Default | None |
| Example | None |

BGP

| | |
|---|---|
| Description | BGP connection details |
| Type | Sting |
| Required | Yes |
| Default | None |
| Example | None |

RESPONSE:

```
HTTP/1.1 200 OK
Content-Type: application/json
{[
  {
    "Name": "Docker Virtual Network",
    "Id": "f7a6ae0574bbf62c42f539b50c8ebde0f728a253b6f",
    "driver" : "ECX_Docker_Network",
    "AuthKey" : "12345ctyur569jfh"
    "IPAM": {
        "driver": "default",
        "Config": [
            {
              "Subnet": "172.17.0.1/16", "172.1.0.2/16"
              "Gateway": "172.17.0.1"
            }
        ]
    },
    "Containers": [{
        "Id":"3386a527aa08b37eab05a6b775fba7ddd40d8f92c",
        "Name" :"container1",
        "Provider" : "Azure"
        "EndpointID": "647c12443e91f642abb60",
        "Vlan":"102"
        "vlanSpeed" : "1gpbs"
        "MacAddress": "02:42:ac:11:00:02",
        "IPv4Address": "172.17.0.2/16",
        "IPv6Address": "",
        "BGP" : "",
        "ASN" : ""
        "Port" : "8090"
    },
    {
        "Id":" d40d8f92c3a6b775fba7dd386a527aa08b37eab05",
        "Name" :"container2",
        "Provider" : "AWS"
        "EndpointID": "647c12443e91f642abb60dfab",
        "Vlan":"103",
        "vlanSpeed" : "1gpbs",
        "MacAddress": "02:42:ac:11:00:FF02",
        "IPv4Address": "172.1.0.2/16",
        "IPv6Address": "",
        "BGP" : "",
        "ASN" : "",
        "Port" : "8091"
    }
  ],
```

```
"Options": {
   "default_bridge": "true",
   "enable_ice": "true",
   "MD5": "true",
   "data center port": "9001"    // E.g., connect Enterprise to Cloud
                                 Exchange
                                 // networking platform
   }
  }
]
```

In the above example API, the request is an HTTP POST command to a uniform resource identifier (URI) that is an API 105 interface for provisioning virtual networks for containers. The body of the message contains one or more request parameters that specify the configuration options for the virtual network for containers. In one example, an administrator of enterprise 116 accesses customer portal 104 to access APIs 105 which transmit the request to orchestration engine 106 to request provisioning of a virtual network for containers. In another example, the administrator of enterprise 116 accesses APIs 105 directly to transmit the request to orchestration engine 106 to request provisioning of a virtual network for containers. In response to receiving the request URI, the orchestration engine 106 provisions a virtual network for containers. Further, the orchestration engine 106 transmits a response message, as depicted above, to enterprise 116 that indicates the successful provisioning of the virtual network as well as the specific configuration details for the provisioned virtual network. The body of the example Response provided above may be similar to the body of an example request, as provided above.

In the above example API, the "name_services" parameter specifies the connection name. This parameter is provided as a string. In the above example response, the "name_services" parameter has set the name of the virtual network to be "Docker Virtual Network."

In the above example API, the "id" parameter specifies an identifier for the virtual network. In an example where Enterprise 116 or orchestration engine 106 access multiple virtual networks, Enterprise 116 and orchestration engine 106 may use the identification tag parameter to distinguish the origin of network traffic received from each virtual network.

In the example above API, the "driver" parameter indicates the type of connection being requested, here, a "ECX_Docker_Network" to indicate a virtual network for containers, in accordance with techniques described herein.

In the above example API, the "data center port" parameter in the options substructure specifies a data port through which enterprise 116 communicates with the virtual network. This parameter may be an integer specifying the actual port of the cloud exchange (e.g., "9001"), where the port represents an interface port of a switch or panel for accessing the cloud exchange networking platform 108.

In the above example API, the "subnet" parameter specifies a subnet of containers on a CSP. For example, and with reference to FIG. 1, the "subnet" parameter may specific a subnet 128A on CSP 122A that includes containers 126A-126B. Each subnet is specific to a particular CSP 122, and each subnet 128 may contain one or more containers 126 executing on hosts within the CSP 122. However, a virtual network as described herein multiple subnets belonging to different CSPs. For example, a single virtual network may include both subnet 128A of CSP 122A and subnet 128B of CSP 122B.

In the above example API, the "gateway" parameter specifies an address of a gateway or edge router of enterprise 116 that exists between the enterprise network 118 and the cloud exchange 102. Orchestration engine 106 routes traffic destined to enterprise 116 from the virtual network to this gateway address.

The following parameters may be included in descriptive data for containers, as a structured container object in a list of "Containers". Description data for containers may represent container registration data.

In the above example API, the "container_ID" parameter specifies a unique identifier for a provisioned container. Enterprise 116, orchestration engine 106, CSPs 122, and other containers 126 may use the container ID to communicate with, manage, or configure the corresponding container.

In the above example API, the "container_name" parameter specifies a human-readable name for a provisioned container. Enterprise 116, orchestration engine 106, CSPs 122, and other containers 126 may use the container ID to communicate with, manage, or configure the corresponding container.

In the above example API, the "provider" parameter specifies a CSP 122 for hosting a container requested to be provisioned by enterprise 116. In some examples, the provider is specified to be one of Azure Express Route, AWS Direct Connect, Cloud Sigma, and the like.

In the above example API, the "speed" parameter specifies a connection speed for the virtual network. In some examples, the "speed" parameter sets a maximum connection speed for the network.

In the above example API, the "vlan" parameter specifies a vlan identifier for enterprise 116. In some examples, orchestration engine 116 and CSPs 122 use the vlan identifier to route traffic exchanged between enterprise 116 and CSPs 122.

In the above example API, the "code" parameter specifies a region for the virtual network. In the above example, the "code" parameter "SG" specifies that the virtual network is to be provisioned in the Singapore region. In other examples, the "code" parameter specifies a city, zip code, county, state, province, country, or continent.

In the above example API, the "macAddress" parameter describes a MAC address for a host of a container. For example, enterprise 116 may use this parameter to request the MAC address for a host of a container. One of orchestration engine 106 or CSP 122 responds by providing the requested MAC address.

In the above example API, the "port" parameter describes a port for a container. In some examples, each container 124 executes on a host. For example, each container 306 executing on host 304 may have a unique host address+port combination or a unique network prefix/subnet+port combination that identifies the container in the cloud service provider network. Enterprise 116 may use this parameter to specify the port for a specific container. Alternatively, enterprise 116 may use this parameter to request the port for a specific container. One of orchestration engine 106 or CSP 122 responds by providing the requested port of the container.

In the above example API, the "ASN" and "BGP" parameters specify ASN and BGP parameters that the orchestration engine 106 should use for facilitating traffic between enterprise 116 and the provisioned virtual network.

The parameters specified in the above example API are for illustrative purposes only. The techniques of the disclosure may be implemented using the example API provided above, or with different parameters not expressly disclosed herein. For example, the techniques of the disclosure may be implemented using only a subset of the parameters described above, or may provision the virtual network for containers without using any of the parameters described above. Nothing in this disclosure should be construed so as to limit the techniques of this disclosure to the example API illustrated above.

Figure 2:
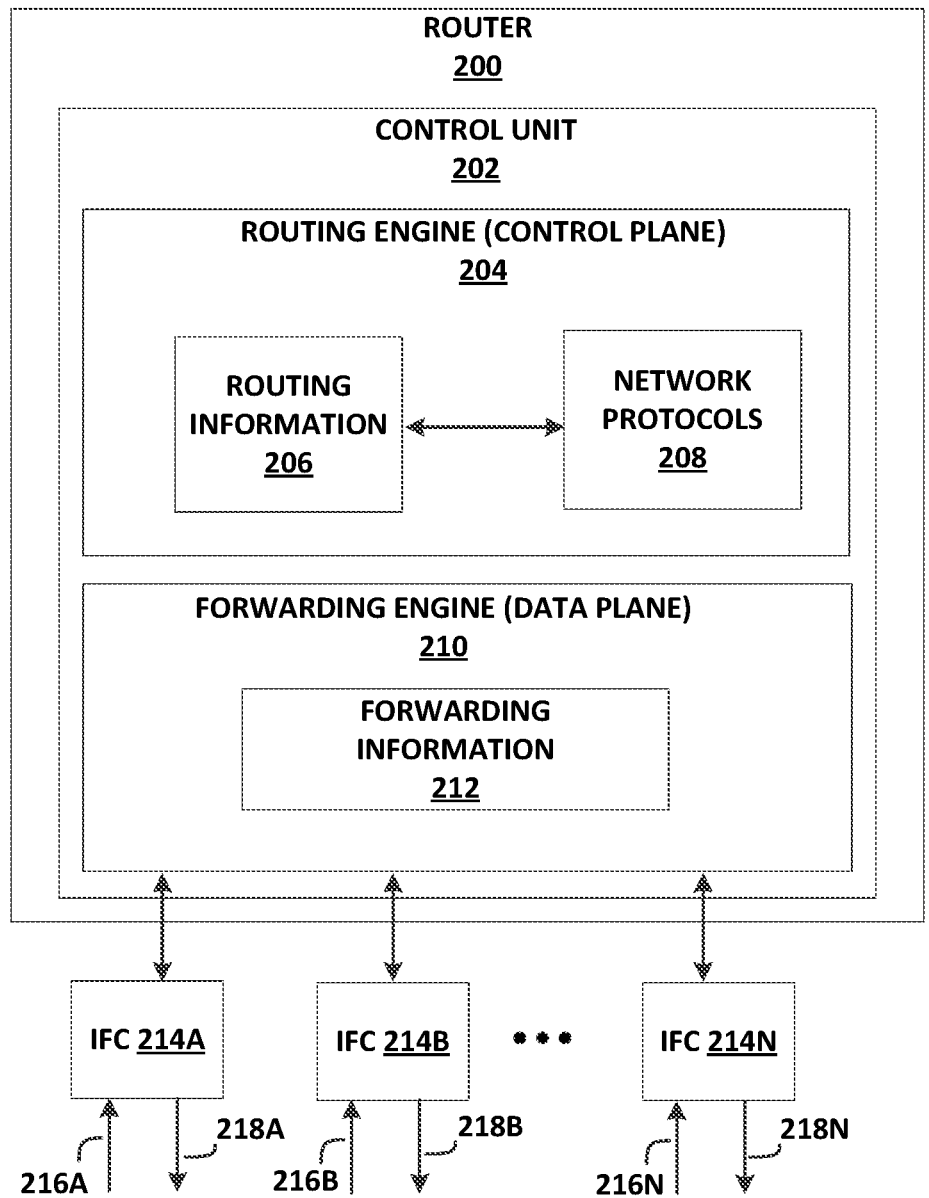
FIG. 2 is a block diagram illustrating an example router according to the techniques of the disclosure.

FIG. 2 is a block diagram illustrating an example router within a cloud exchange in accordance with one or more techniques of the disclosure. In general, router 200 may operate substantially similarly to routers 110A-110N in FIG. 1. In this example, router 200 includes interface cards 214A-214N ("IFCs 214") that may receive packets via incoming links 216A-216N ("incoming links 216") and send packets via outbound links 218A-218N ("outbound links 218"). IFCs 214 are typically coupled to links 216, 218 via a number of interface ports. Router 200 also includes a control unit 202 that determines routes of received packets and forwards the packets accordingly via IFCs 214.

Control unit 202 may comprise a routing engine 204 and a packet forwarding engine 210. Routing engine 204 operates as the control plane for router 200 and includes an operating system that provides a multi-tasking operating environment for execution of a number of concurrent processes. Routing engine 204, for example, may execute software instructions to implement one or more network protocols 208. For example, protocols 208 may include one or more routing and switching protocols, such as Border Gateway Protocol (BGP), Multi-protocol Label Switching (MPLS), Virtual Private LAN Services (VPLS), Ethernet Virtual Private Networking (EVPN), or Provider Backbone Bridging EVPN (PBB-EVPN) for exchanging routing information with other routing devices and for updating routing information 206. Routing information 206 may describe a topology of the cloud exchange in which router 200 resides, and may also include routes through the shared trees in the computer network. Routing information 206 describes various routes within the computer network, and the appropriate next hops for each route, i.e., the neighboring routing devices along each of the routes. Routing engine 204 analyzes stored routing information 206 and generates forwarding information 212 for forwarding engine 210. Forwarding information 212 may associate, for example, network destinations for certain multicast groups with specific next hops and corresponding IFCs 214 and physical output ports for output links 218. Forwarding information 212 may be a radix tree programmed into dedicated forwarding chips, a series of tables, a complex database, a link list, a radix tree, a database, a flat file, or various other data structures.

Forwarding information 212 may include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops. Router 200 may be configured, at least in part, by interconnection platform 103.

According to the techniques of the disclosure, router 200 may operate as one of routers 110 in the example of FIG. 1. In one example, routing engine 204 may use routing protocols 208 to exchange routing information with each of a plurality of cloud services (e.g., cloud services 124A, 124B) and store learned routes as routing information 206. Forwarding engine 210 may associate various subnets, such as subnets 128A and 128B, with various cloud services, such as cloud services 124A and 124B, respectively, and store this information as forwarding information 212. Router 200 may receive an L2/L3 data communication, originating from container 126A and destined for container 126D, along incoming links 216. Control unit 202 may parse the data communication for a network (e.g., IP) address within subnet 128B and, based on forwarding information 212, forward the data communication toward subnet 128B wherein container 126D may receive the forwarded communication. Forwarding engine 210 may transmit the data communication along outbound links 218 to subnet 128B within cloud service 124B, wherein container 126D may receive the data communication.

Accordingly, it may be seen that a router within a cloud exchange implemented according to the techniques of this disclosure may receive a data communication from a first container within a first private network and transmit that data communication to a second container within a second private network. Such a router may allow a container to exchange data between microservices executing on containers on the same or different private network, or to monitor the health of a container on another private network. Further, such a router may allow a private network to maintain more effective service to their customers by minimizing or remedying interruptions to a microservice provided by a particular container. Further, such a router may allow a private network to more effectively perform load balancing of the network, so as to avoid strain on one particular system, which may otherwise cause adverse performance and negatively impact the experience of the customer.

The architecture of router 200 illustrated in FIG. 2 is shown for example purposes only. The techniques as set forth in this disclosure may be implemented in the example router of FIG. 2, as well as other types of routers not described specifically herein. In other examples, router 200 may be configured in a variety of ways. In one example, some of the functionally of control unit 202 may be distributed within IFCs 214. In another example, control unit 202 may comprise a plurality of packet forwarding engines. Nothing in this disclosure should be construed so as to limit the techniques of this disclosure to the example architecture illustrated by FIG. 2.

Figure 3:
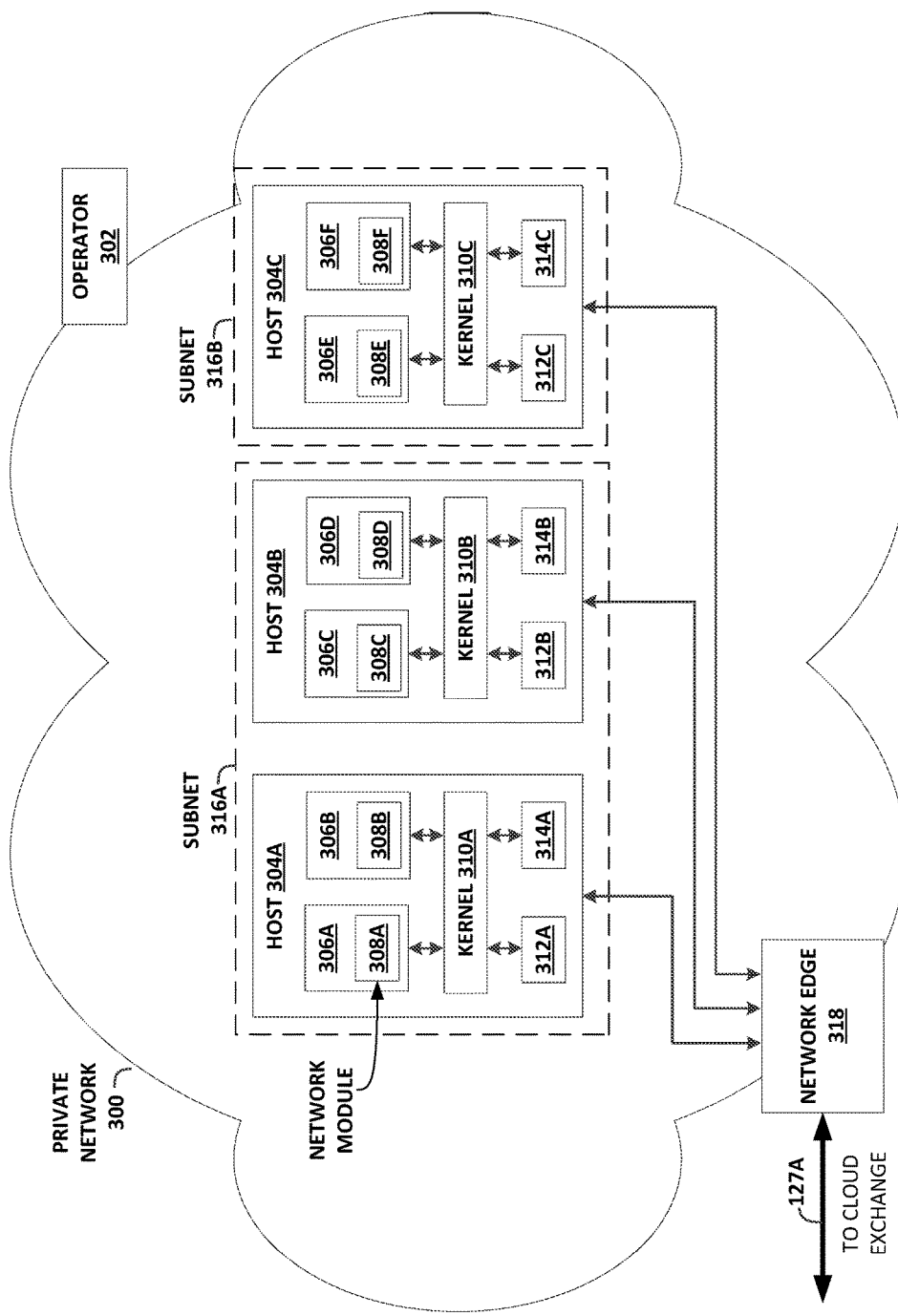
FIG. 3 is a block diagram illustrating an example private network according to the techniques of the disclosure.

FIG. 3 is a block diagram illustrating an example private network according to the techniques of the disclosure. In the example of FIG. 3, operator 302 may operate a private network 300 possessing computing resources by which one or more customers may execute a plurality of applications and microservices. In some examples, operator 302 may be an enterprise, such as enterprise 116 of FIG. 1. In other examples, operator 302 may be a CSP, such as CSP 122A or CSP 122B of FIG. 1. In some examples, private network 300 may be an enterprise network, such as enterprise network 118 of FIG. 1. In other examples, private network 300 may be a cloud service, such as cloud service 124A or 124B of FIG. 1. Private network 300 may comprise a plurality of hosts 304A, 304B, and 304C (collectively, "hosts 304). In some examples, a host may be a server running on private network 300. In other examples, one or more hosts may be one or more virtual machines executed on a server running on private network 300. Each of hosts 304 may have an IP address such that the host may be identified on private network 300. In some examples, a plurality of hosts may possess a plurality of IP addresses falling within an IP subnet, such as IP subnets 316A, 316B. Hosts 304 may communicate with network edge device 318, which may represent a router or L3 switch. Network edge device 318 may connect along virtual circuit 127A to a cloud exchange, such as cloud exchange 102 of FIG. 1. In some examples, network edge router 318 may operate to forward messages between hosts 304 and the cloud exchange.

Each host may execute one or more containers. In the example of FIG. 3, host 304A is configured to execute containers 306A and 306B, host 306B is configured to execute containers 306C and 306D, and host 304C is configured to execute containers 306E and 306F (collectively, "containers 306"). Containers 306 may operate in a similar fashion as and may represent any of containers 125 and 126 of FIG. 1. Each host 304 may implement a specific kernel instance 310, common libraries 312, and kernel specific libraries 314. Each of the containers executed within a host share a kernel 310 and common libraries 312 (e.g., containers 306A and 306B of host 304A share kernel 310A and common libraries 312A). In one example, any of hosts 304 may execute the Docker container application for the Linux operating system, which in such examples are represented by containers 306 and kernel 310, respectively.

In some examples, each of the containers within the host may share the IP address of the host. In some examples, each container may be uniquely identified by a container ID or port ID. In some examples, the port ID of a container identifies a Transmission Control Protocol (TCP) port or a User Datagram Protocol (UDP) port. In the example of FIG. 3, containers 306A and 306B may share IP address 192.168.1.125 with host 304A. In this example, container 306A may be associated with port ID 5001 for the host 304A while container 306B may be associated with port ID 5002. In some examples, host 304A may forward traffic destined for TCP port 5001 to container 306A and forward traffic destined for TCP port 5002 to container 306B. According to the techniques of the disclosure, each of containers 306 may possess a network module 308, as described herein, to allow the container to communicate with the cloud exchange.

In some examples, an enterprise, such as enterprise 116 of FIG. 1, may purchase a number of containers to be deployed within a cloud service, such as cloud service 124A. In one example, enterprise 116 may create at least one application, such as a microservice. Each of containers 306 may provide an execution environment for the applications. In some examples, each of containers 306 may provide an execution environment for at least one unique application or microservice, while in other examples, each of containers 306 may provide redundant access to at least one application or microservice. In some examples, each customer of private network 300 may access a single container (e.g., container 306A). In further examples, a customer may have access to a plurality of containers (e.g., containers 306A, 306B, and 306C). In one example, each container within a subnet may provide a particular suite of applications or microservices. In a further example, each container within a subnet may provide access to private network 300 to a particular customer or group of customers According to the techniques of the disclosure, containers 306 include respective network modules 308 extended to obtain and send, to a cloud exchange, container registration data including, e.g., network data and container identification data for the container. For example, container 306A includes network module 308A that obtains a network address for host 304A in subnet 316A and further obtains a container identifier for container 306A, the container identifier usable by the kernel 310A to identify container 306A from other containers executing on host 307A, such as container 306B. In some cases, the container identifier is a unique container identifier that distinguishes container 306A from all other containers in private network 300. In some cases, the container identifier is a networking port, such as a TCP/UDP port, that distinguishes container 306A from other containers executing on the host. In some cases, the container identification data includes both a unique container identifier and a networking port.

Network modules 308 self-register the container registration data by invoking APIs 105 of cloud exchange 102 to send the container registration data. In this way, interconnection platform 103 of cloud exchange 102 receives container registration data by which interconnection platform 103 may, via a virtual circuit, send data communications to the corresponding container 306. For example, with respect to container 306A, network module 308A may invoke APIs 105, via a virtual circuit 127A with cloud exchange 102, to send the container registration data for container 306A to interconnection platform 103.

Interconnection platform 103 may store container registration data for containers 306. Interconnection platform 103 may associate multiple containers in an association and send each container in the association container registration data for other containers in the association. As a result, a container in an association may use the container registration data to send data communications via a cloud exchange to another container in the association that is located in a different private network coupled to the cloud exchange.

According to the techniques of the disclosure, container 306A within private network 300 may communicate with a container within another private network connected to cloud exchange 102, such as container 126D within cloud service 124B. In this example, based on container registration data received from interconnection platform 103, container 306A may generate a data communication having a container identifier (e.g., a port) indicating the destination container (e.g., container 126D) and a network address (e.g., an IP address within an enterprise network 116 subnet) for a host that executes the destination container. Container 306A may output this data communication for transmission outside private network 300 via virtual circuit 127A to routers 110 of cloud exchange 102. As described above, orchestration engine 106 may operate networking platform 108 to forward the communication to the destination subnet of the appropriate cloud service (e.g., to subnet 128B of cloud service 124B). Cloud service 124B may direct the data communication to container 126D within subnet 128B. If container 126D responds with a second data communication, cloud service 124B may pass the second data communication to routers 110 of cloud exchange 102. Cloud exchange 102 may include networking platform 108 to redirect the second data communication to private network 300 along communication link 127A.

Network edge device 318 may receive the second data communication from virtual circuit 127A and forward the data communication to the host having the IP address identified by the data communication (e.g., host 304A). In some examples, the destination IP address of second data communication may specify a TCP/UDP port of host 304A. Host 304A may pass the second data communication to the container having a port ID matching the TCP/UDP port of the destination IP address. Thus, it may be seen that a private network implemented according to the techniques of the disclosure may enable communication between a first container within a first private network connected to a cloud exchange and a second container within a second private network connected to the cloud exchange.

A plurality of private networks connected to a cloud exchange implemented according to the techniques of the disclosure may allow a container within a first private network to monitor the health of a second container within a second private network. In one example, private network 300 may operate as cloud service 124A in the example of FIG. 1. Similarly, each of containers 306 may operate as one of containers 126 in the example of FIG. 1. In this example, container 306A within private network 300 may desire to check the health of a container within a second cloud service, such as container 126D within cloud service 124B. In one example, container 306A may evaluate the health of container 126D by "pinging" container 126D. In other words, Container 306A may transmit an echo request packet to container 126D and measure the round-trip time required to receive an echo reply packet from container 126D. Container 306A may use network module 308A to transmit an echo request packet having an identifier, such as an IP address and port, indicating container 126D as the destination container. Network module 308A may forward the echo request to network edge device 318, which in turn may transmit this communication along communication link 127A to cloud exchange 102, where cloud exchange 102 may forward the communication to cloud service 124B and ultimately, to container 126D, as discussed above. In response, container 126D may transmit an echo reply packet to container 306A according to the techniques of the disclosure. Container 306A may measure the round-trip time between transmitting the echo request packet and receiving an echo response packet.

In some examples, if container 306A never receives an echo response packet, it may determine that one or more of container 126D, a host executing container 126D, subnet 128B, and cloud service 124B is disconnected from the network or unresponsive. In one example, container 306A may provide a notification that one or more of container 126D, a host executing container 126D, subnet 128B, and cloud service 124B may be offline. Further, container 306A may request deployment of one or more containers of containers 306 and request the transfer of customers and data using container 126D to the one or more deployed containers of containers 306. In this way, private network 300 may avoid service interruptions to a customer attempting to access an application within container 126D by transferring the customer and his data to applications within the one or more containers of containers 306.

In further examples, if container 306A receives an echo response packet, but the round-trip time exceeds a predetermined maximum threshold time, container 306A may determine that one or more of container 126D, a host executing container 126D, subnet 128B, and cloud service 124B is over capacity and unable to handle the volume of network traffic assigned to it. In one example, container 306A may provide a notification that one or more of container 126D, a host executing container 126D, subnet 128B, and cloud service 124B may be over capacity. Further, container 306A may request deployment of one or more containers of containers 306 and request the transfer of at least a portion of the customers and data using container 126D to the one or more containers of containers 306. In some examples, the predetermined maximum threshold time may be a maximum permitted time before timeout as set by a networking standard. In other examples, the predetermined maximum threshold time may be a time set by a Quality Assurance team to ensure fast and efficient connection speeds to the customer and improve customer experience. In this way, private network 300 may mitigate reductions in network performance experienced by a customer attempting to access an application within container 126D by load-balancing a portion of customers and data to applications within the one or more deployed containers of containers 306.

The architecture of private network 300 illustrated in FIG. 3 is shown for example purposes only. The techniques as set forth in this disclosure may be implemented in the example cloud service of FIG. 3, as well as other types of cloud services not described specifically herein. In other examples, private network 300 may be configured in a variety of ways. In some examples, private network 300 may implement various APIs, operating systems, hardware, or software that share a common communication protocol with the cloud exchange. In other examples, each cloud service of the cloud exchange may use a different communication protocol to exchange data with the cloud exchange, and the cloud exchange may act to facilitate or translate communications between cloud services using different communication protocols. Nothing in this disclosure should be construed so as to limit the techniques of this disclosure to the example architecture illustrated by FIG. 3.

Figure 4:
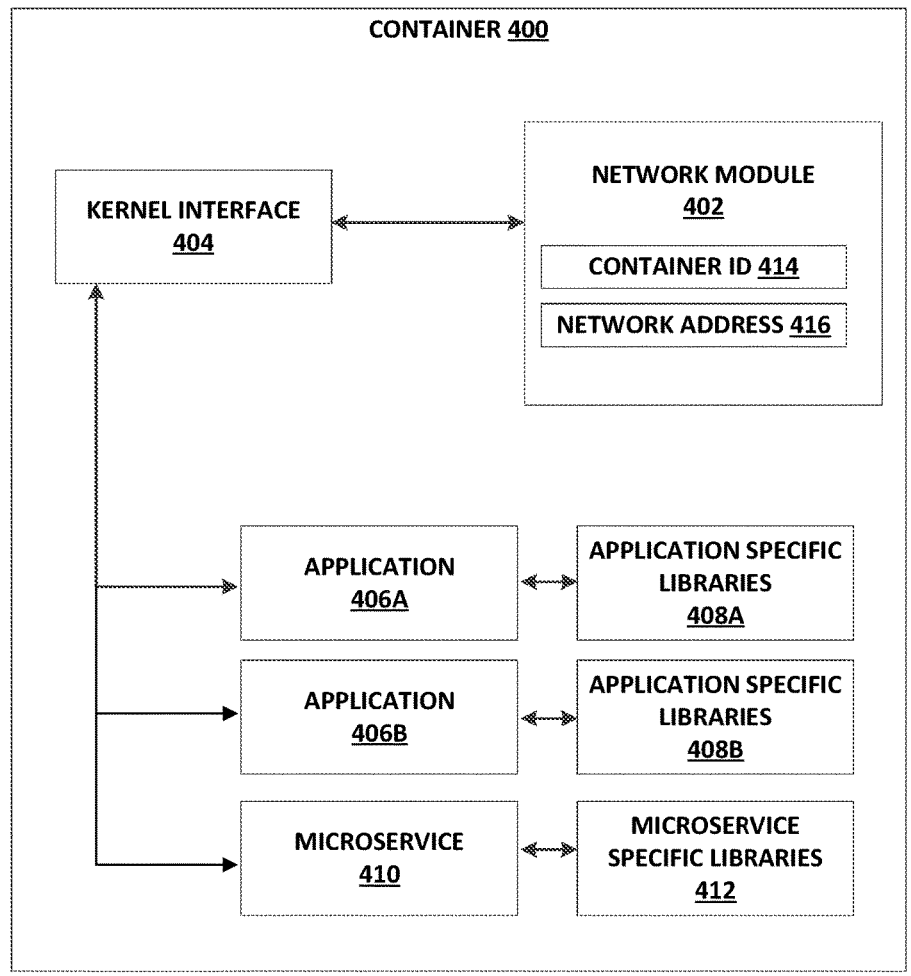
FIG. 4 is a block diagram illustrating an example container according to the techniques of the disclosure.

FIG. 4 is a block diagram illustrating an example container according to the techniques of the disclosure. Container 400 may be a virtualized container such as those provided by the Docker container technology for the Linux operating system. In some examples, container 400 may share an operating system and common libraries with other containers and the host kernel. In some examples, container 400 may send and receive data communications, control signals, and various other transmissions to and from the system kernel through kernel interface 404.

In some examples, container 400 may use network module 402 in conjunction with kernel interface 404 to compose, send, and receive data to and from a network. For example, network module 402 may implement enable container 400 to communicate according to various networking protocols, such as Virtual Extensible LAN (VXLAN), IPVLAN, MACVLAN, VPLS, EVPN, or PBB-EVPN. According to the techniques of the disclosure, network module 402 may operate to self-register the corresponding container of a plurality of containers, operating within a plurality of networks coupled to a cloud exchange, with the cloud exchange to facilitate in communications among the containers via the cloud exchange. Network module 402 includes several identifiers so that container 400 may be identified on a private network, such as a cloud service or enterprise network. Container identifier 414 is a data field that uniquely identifies container 400 against other containers. In some examples, container identifier 414 is a port ID which corresponds to a TCP/UDP port of the host computer executing container 400. Host network address 416 is a data field that identifies the network address of the host on which container 400 executes. In some examples, host network address 416 may be an IP address.

In some examples, container 400 is configured to execute at least one microservice 410 and associated microservice-specific libraries 412. In other examples, container 400 is configured to execute at least one application and associated application-specific libraries, such as application 406A and 406B and application-specific libraries 408A and 408B, respectively. Container 400 may provide the at least one microservices and applications to a customer for access through a cloud service. Because container 400 is virtualized and isolated from the system kernel and other containers, container 400 may provide a customer with safe and secure access to the at least one microservices and applications. In one example, container 400 may be a container within a Microsoft Azure cloud service. In this example, container 400 may provide a customer with an environment to execute a suite of applications. In another example, container 400 may be a container within an Amazon Webservices cloud service. In this example, container 400 may provide a customer with an environment to execute one or more microservices.

In some examples, a microservice or application of container 400 may communicate with a microservice or application of a second container within another private network of the cloud exchange. In one example, application 406A may be a network service daemon for monitoring the health of other containers on the cloud exchange. Application 406A may use network module 402 to encode an echo request packet to forward to a second container. In some examples, the echo request packet may contain a container identifier identifying the container to be monitored. In further examples, the echo request packet may also contain a host address identifier identifying the address of the host executing the container to be monitored. Kernel interface 404 may pass the echo request packet to the kernel of the host executing container 400 for forwarding through the cloud exchange to the container to be monitored. Kernel interface 404 may receive an echo reply packet from the kernel of the host, which may be decoded by network module 402. Application 406A may determine the round-trip time required to receive the echo reply packet. In some examples, if application 406A determines that the round-trip time is greater than a predetermined maximum threshold time, application 406A may provide a notification via kernel interface 404 that the monitored container may be over capacity. In further examples, application 406A may provide a request via kernel interface 404 to deploy additional containers and transfer a portion of the customers and data using the monitored container to the additional deployed containers. Further, if application 406A never receives an echo reply packet, it may provide a notification via kernel interface 404 that the monitored container may be disconnected from the network. In some examples, application 406A may provide a request via kernel interface 404 to deploy additional containers and transfer all of the customers and data using the monitored container to the additional deployed containers. Thus, it may be seen that a container with a network module and monitoring daemon according to the techniques of the disclosure may allow a private network to monitor various containers across various private networks in a cloud exchange and dynamically allocate or deallocate containers to maintain service integrity to customers of the private network and to load-balance network traffic across the containers of the private networks.

The architecture of container 400 illustrated in FIG. 4 is shown for example purposes only. The techniques as set forth in this disclosure may be implemented in the example container of FIG. 4, as well as other types of containers not described specifically herein. In other examples, container 400 may be configured in a variety of ways. In some examples, container 400 may implement various APIs, one or more applications, or one or more microservices. In other examples, container 400 may implement a single application or a single microservice. Nothing in this disclosure should be construed so as to limit the techniques of this disclosure to the example architecture illustrated by FIG. 4.

Figure 5:
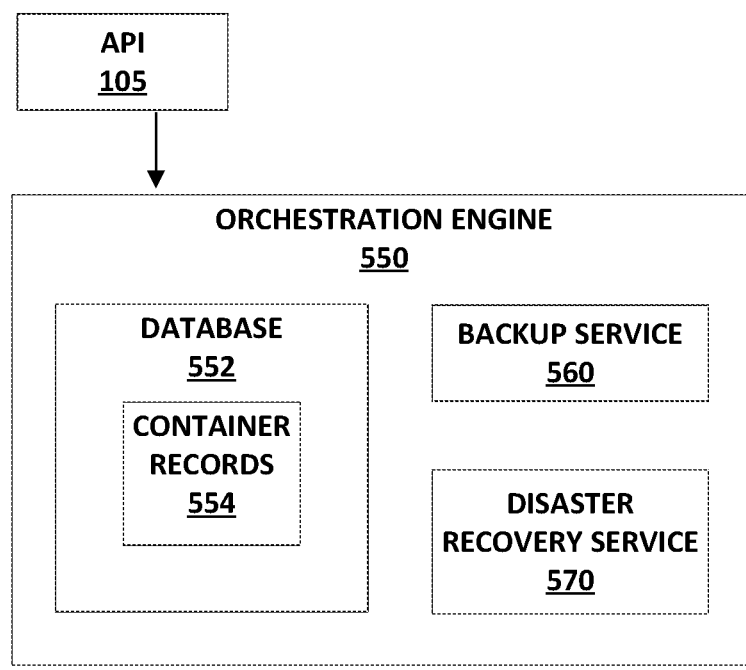
FIG. 5 is a block diagram illustrating an orchestration engine for a cloud exchange according to techniques described in this disclosure.

FIG. 5 is a block diagram illustrating an orchestration engine for a cloud exchange according to techniques described in this disclosure. Orchestration engine 550 may represent an example instance of orchestration engine 106 of FIG. 1. While FIG. 5 is described with reference to FIG. 1, FIG. 5 may apply generally to the techniques of the disclosure.

Orchestration engine 550 receives, via APIs 105, container registration data from containers executing in private networks (e.g., enterprise and CSP networks) coupled to a cloud exchange managed at least in part by an interconnection platform that includes the Orchestration engine 550. Orchestration engine 550 stores, to a database 552, container records 554 having entries for respective containers and including corresponding container registration data for containers. Orchestration engine 550 may use container registration data to extend network connectivity through the private network that includes a container and address the container directly via a virtual circuit by which the private network communicates with the cloud exchange and, in some cases, other private networks.

Orchestration engine 550 in some instances offers a backup service 560 by which Orchestration engine 550 may, for a customer of the cloud exchange, facilitate container backup to a cloud service provider network. Backup service 560 may be executed by one or more applications and/or microservices of orchestration engine. Orchestration engine 550 may receive, from an enterprise or other customer of the cloud exchange, a service key identifying a cloud service. The service key may be associated with and identify an IP subnet within the cloud service to which the service key grants access. Orchestration engine 550 may store the service key.

Orchestration engine 550 may create an association between containers owned/accessible to an enterprise but operating in different private networks (e.g., an enterprise network and a cloud service network). Based on a network address for a container and an IP subnet identified by a service key, Orchestration engine 550 may correlate a service key to a container executing at a cloud service network to associate the container to an enterprise that provided the service key. In this way, the container is registered to the enterprise in Orchestration engine 550.

Orchestration engine 550 may establish a virtual circuit between an enterprise network and the cloud service network. Containers may provide their corresponding container registration data to Orchestration engine 550 via the virtual circuit (e.g., a VLAN). Orchestration engine 550 may in some cases provide the container registration data to the enterprise such that containers executing at the enterprise network may address containers in the cloud service network using a container host network address and container port/identifier, via the virtual circuit. Containers in the enterprise network may ping containers in the cloud service network to determine a health of the containers in the cloud service network, and vice-versa.

Orchestration engine 550 may in some cases offer a disaster recovery service 470 by which Orchestration engine 550 may, for a customer of the cloud exchange, facilitate disaster recovery by migrating containers among different cloud service provider networks. Disaster recovery service 570 may be executed by one or more applications and/or microservices of orchestration engine. Orchestration engine 550 may allow agents of an enterprise network accessing the interconnection platform via a portal to move containers executing at first cloud service provided by a first cloud service provider to a second cloud service provided by a second cloud service provider.

Orchestration engine 550 may dynamically establish a virtual circuit with a second cloud service to facilitate the disaster recovery service 570 from a first cloud service. Again, containers in the second cloud service network may provide their corresponding container registration data to Orchestration engine 550 via the new virtual circuit. Orchestration engine 550 may then migrate container from the first cloud service to the second cloud service.

Backup service 560 and disaster recovery service 570 may be vendor-neutral in that the cloud exchange provider offers services 560, 570 using any of a plurality of cloud service providers selectable by the enterprise. In some cases, Orchestration engine 550 may independently deploy containers to cloud services in order to facilitate the back-end setup for any of services 560, 570.

For both backup service 560 and disaster replication service 570, the enterprise operator may create an association between containers. The enterprise operator may access a list of containers for the enterprise and a list of containers for a cloud service and create associations between containers from the different lists. For instance, the enterprise operator may specify container 126A is a replica of container 125A. In some cases, containers accessible via a particular virtual circuit may be automatically associated by Orchestration engine 550. Having been associated, Orchestration engine 550 then provides the container registration data for a container to associated containers to enable the associated containers to address data communications to the container.

Figure 6:
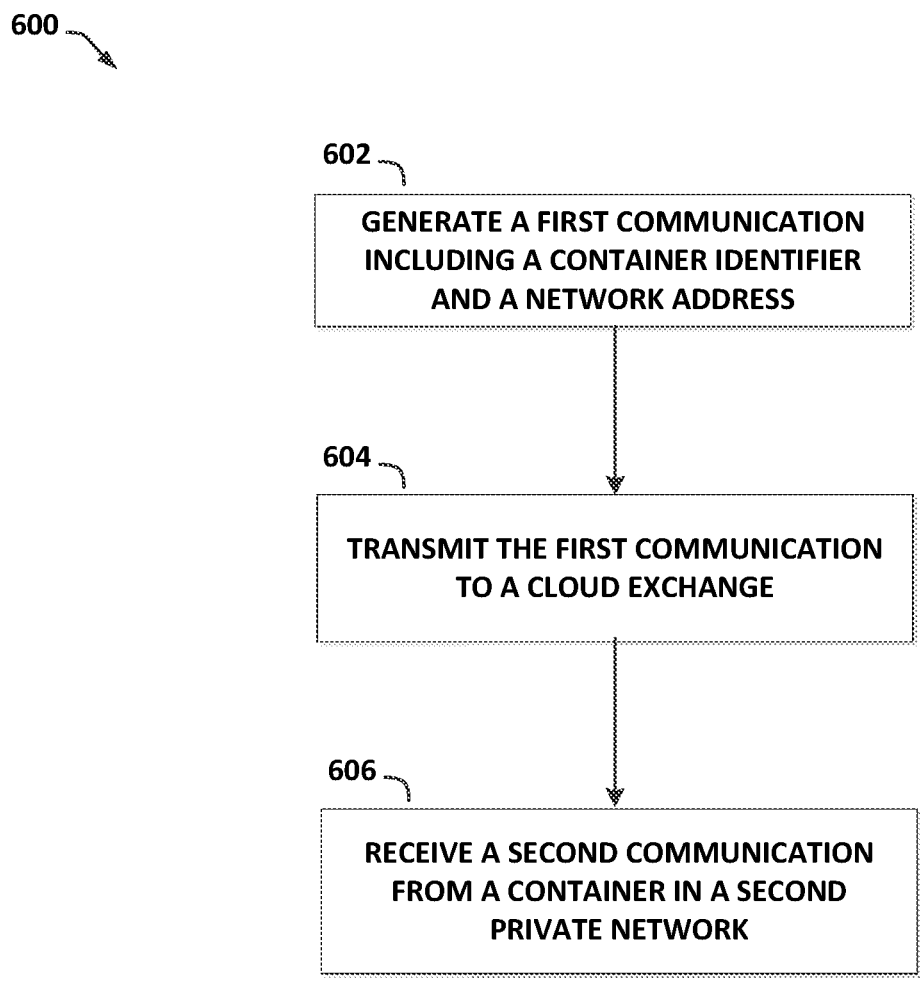
FIG. 6 is a flowchart illustrating an example method according to the techniques of the disclosure.

FIG. 6 is a flowchart illustrating an example method according to the techniques of the disclosure. FIG. 6 is described with reference to FIGS. 1 and 4; however, FIG. 6 may apply generally to the techniques of the disclosure. In some examples, a first container, such as container 126A, may communicate with a second container, such as container 126D. In one example, container 126A may compose a first data communication to container 126D (602). The first data communication may indicate a container identifier of container 126D and a network address for a host executing at cloud service 124B and hosting container 126D. In some examples, the container identifier may be a port ID identifying a TCP/UDP port of the host, and the network address may be an IP address through which the host may be reached. Container 126A may transmit the first data communication to a router of the cloud exchange, such as router 110A (604). Router 110A may forward the message through the cloud exchange to the host executing container 126D. Container 126A may receive a second data communication from container 126D (606). The second data communication may indicate a container identifier of container 126A and a network address for a host executing at cloud service 124A and hosting container 126A.

Figure 7:
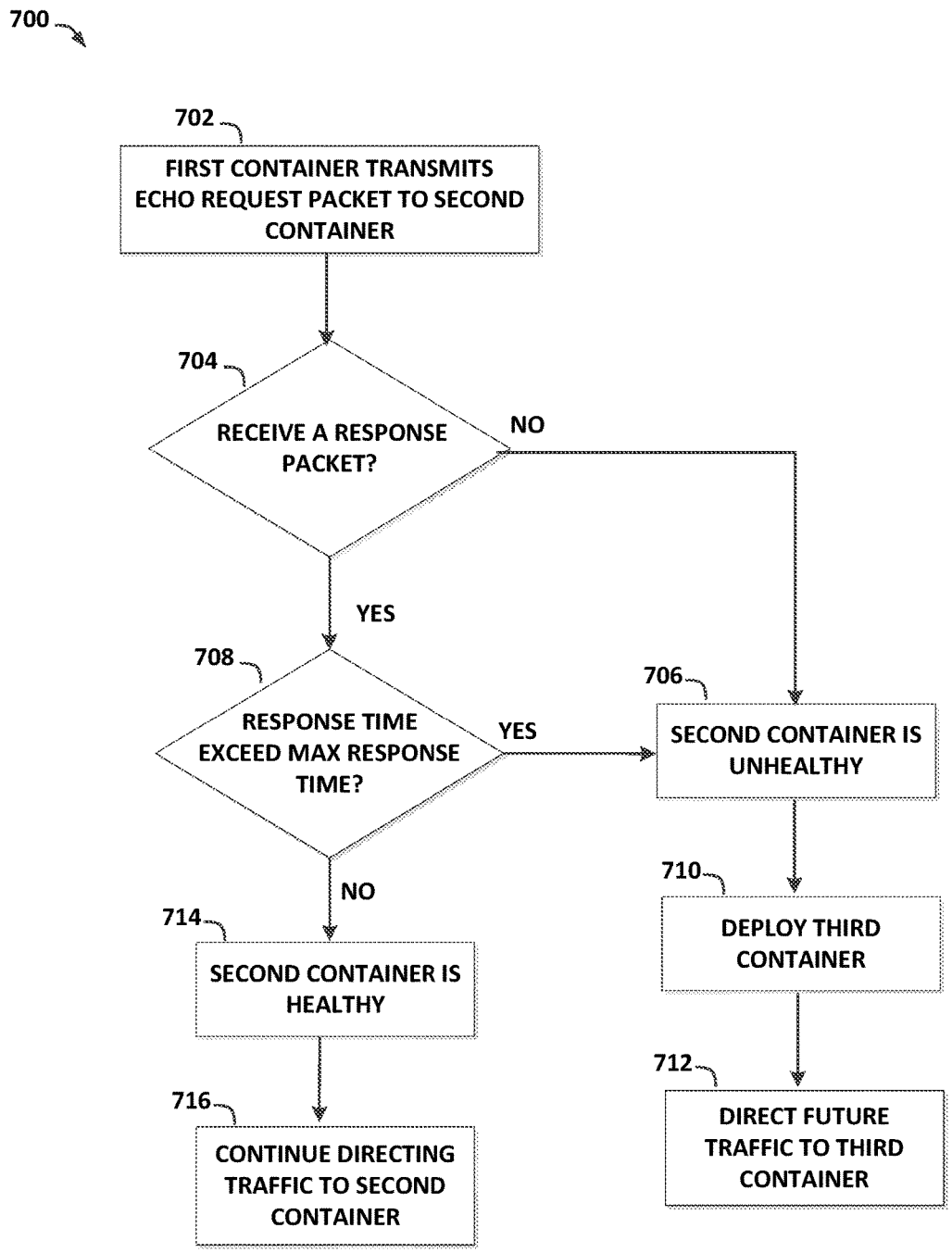
FIG. 7 is a flowchart illustrating an example method for determining the health of a container according to the techniques of the disclosure.

FIG. 7 is a flowchart illustrating an example method for determining the health of a container according to the techniques of the disclosure. FIG. 7 is described with reference to FIGS. 1 and 4; however, FIG. 7 may apply generally to the techniques of the disclosure. According to the techniques of the disclosure, in some examples, a first container, such as container 126A may monitor the health of a second container, such as 126D of cloud service 124B. In some examples, container 126A may check the health of container 126D by transmitting an echo request packet to container 126D (702). Container 126A may determine whether an echo response packet is received (704). If no echo response packet is received, container 126A may determine that container 126D is unhealthy (706). If an echo response packet is received, but the time taken to receive the echo response packet (i.e., the round-trip time) exceeds a predetermined maximum threshold time (708), container 126A may determine that container 126D is unhealthy (706). If the round-trip time is less than a predetermined maximum threshold time, container 126A may determine that container 126D is healthy (714). As such, container 126A may continue to direct traffic to container 126D.

In some examples, if container 126A determines that container 126D is unhealthy (706), container 126A may take corrective action. In some examples, container 126A may send a request to orchestration engine 106 to deploy a second container, such as container 126E (710). In further examples, container 126A may redirect all or a portion of network traffic destined for container 126D to the deployed container, i.e., container 126E. In some examples, container 126A may take different actions depending on whether it never received an echo response packet or whether it received an echo response packet, but the round-trip time exceeded a maximum permitted response time. For example, if container 126A never receives an echo response packet, it may determine that one or more of container 126D, the host executing container 126D, subnet 128B, or cloud service 124B is disconnected from the network. In this example, container 126A may determine that all network traffic directed to container 126D should be redirected to deployed container 126E to ensure that service to the customer is not interrupted. In other examples, if container 126A received an echo response packet, but the round-trip time exceeded a maximum permitted response time, it may determine that one or more of container 126D, the host executing container 126D, subnet 128B, or cloud service 124B is over capacity, and at least a portion of network traffic directed to container 126D should be redirected to deployed container 126E to ensure that the customer experience is not negatively impacted by poor network connection speeds.

Figure 8:
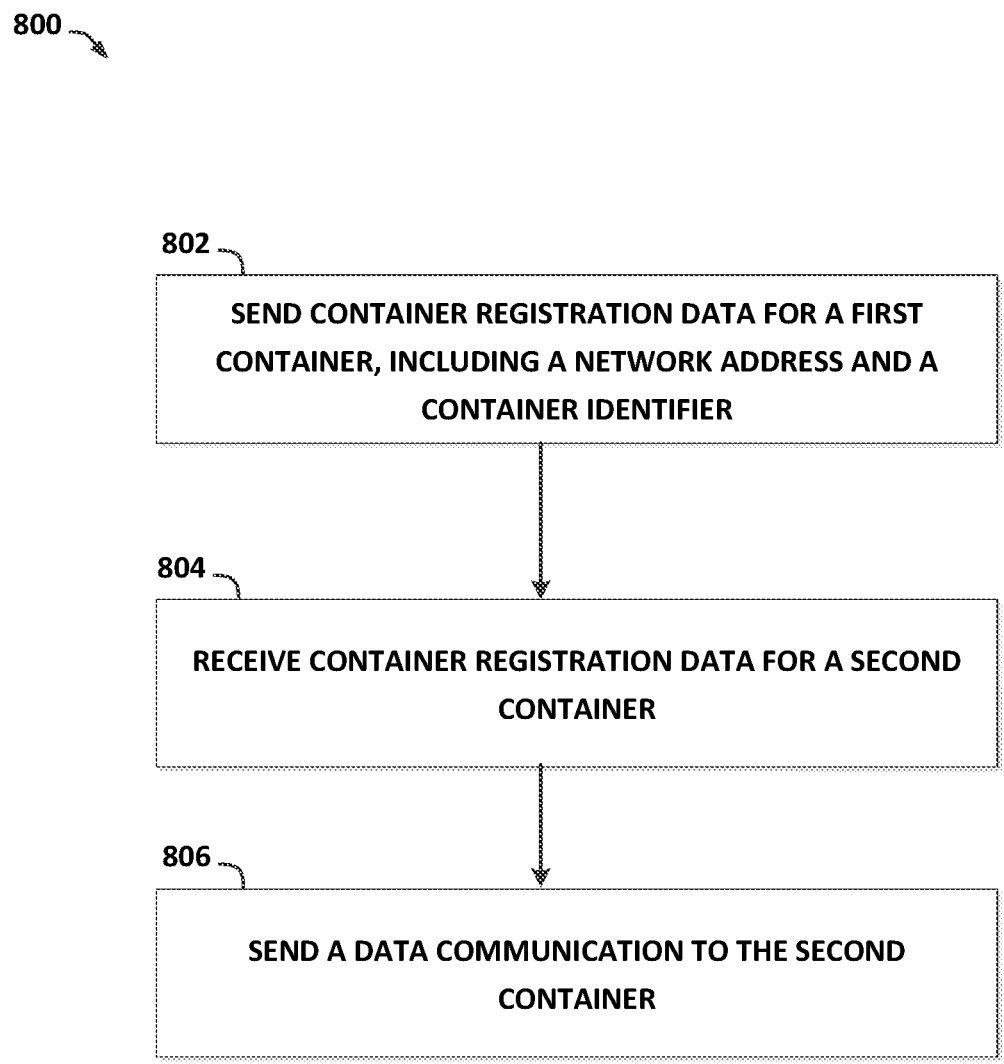
FIG. 8 is a flowchart illustrating an example method for transmitting container registration data for a container.

FIG. 8 is a flowchart illustrating an example method for transmitting container registration data for a container. In one example, a container within a private network of a plurality of private networks connected to a cloud exchange may send container registration data for the container to the cloud exchange (802). In some examples, the container registration data may comprise a network address for a host that executes the container and a container identifier for the container. In some examples, the network address may be an IP address of the host. In some examples, the container identifier may be a port ID identifying a TCP or UDP port of the host. In some examples, the container may comprise a first container, and the container registration data may comprise first container registration data. In some examples, the container may receive, from the cloud exchange, second container registration data for a second container (804). In some examples, the container may send a data communication based on the second container registration data to the second container (806).

Figure 9:
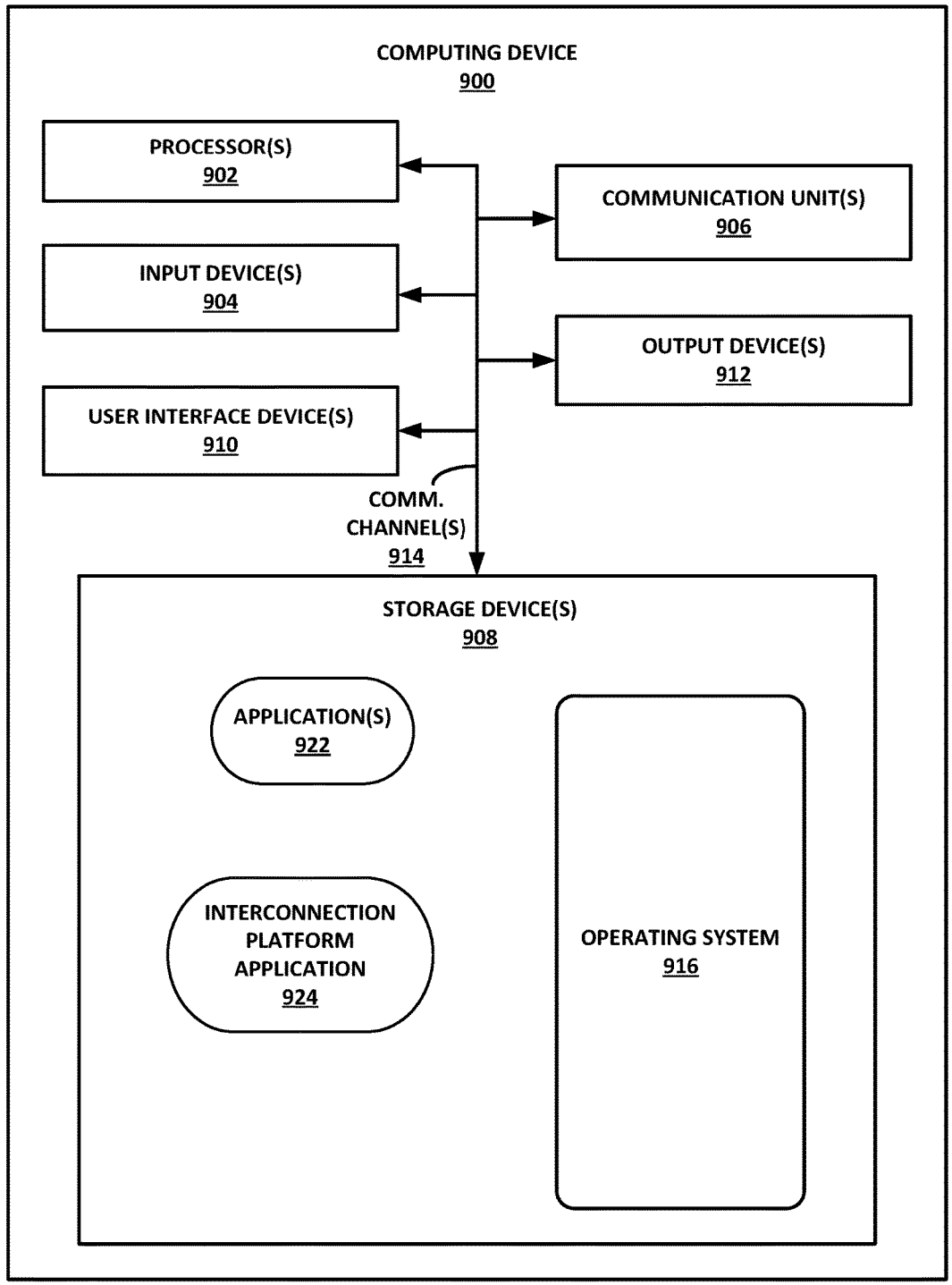
FIG. 9 is a block diagram illustrating one example of a computing device that operates in accordance with one or more techniques of the present disclosure.

FIG. 9 is a block diagram illustrating one example of a computing device that operates in accordance with one or more techniques of the present disclosure. FIG. 3 may illustrate a particular example of a server, host 304, or other computing device 900 that includes one or more processor(s) 902 for executing at least a portion of interconnection platform 924, or any other computing device described herein. Other examples of computing device 900 may be used in other instances. Although shown in FIG. 9 as a stand-alone computing device 900 for purposes of example, a computing device may be any component or system that includes one or more processors or other suitable computing environment for executing software instructions and, for example, need not necessarily include one or more elements shown in FIG. 9 (e.g., communication units 906; and in some examples components such as storage device(s) 908 may not be colocated or in the same chassis as other components). Computing device 900 may be located and execute, for example, another interconnection facility, or at a branch office or cloud computing environment employed or used by a colocation facility or cloud exchange provider.

As shown in the specific example of FIG. 9, computing device 900 includes one or more processors 902, one or more input devices 904, one or more communication units 906, one or more output devices 912, one or more storage devices 908, and one or more user interface (UI) devices 910. Computing device 900, in one example, further includes one or more applications 922, interconnection platform application 924, and operating system 916 that are executable by computing device 900. Each of components 902, 904, 906, 908, 910, and 912 are coupled (physically, communicatively, and/or operatively) for inter-component communications. In some examples, communication channels 914 may include a system bus, a network connection, an inter-process communication data structure, or any other method for communicating data. As one example, components 902, 904, 906, 908, 910, and 912 may be coupled by one or more communication channels 914.

Processors 902, in one example, are configured to implement functionality and/or process instructions for execution within computing device 900. For example, processors 902 may be capable of processing instructions stored in storage device 908. Examples of processors 902 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 908 may be configured to store information within computing device 900 during operation. Storage device 908, in some examples, is described as a computer-readable storage medium. In some examples, storage device 908 is a temporary memory, meaning that a primary purpose of storage device 908 is not long-term storage. Storage device 908, in some examples, is described as a volatile memory, meaning that storage device 908 does not maintain stored contents when the computer is turned off. Examples of volatile memories include random access memories (RAM), dynamic random access memories (DRAM), static random access memories (SRAM), and other forms of volatile memories known in the art. In some examples, storage device 908 is used to store program instructions for execution by processors 902. Storage device 908, in one example, is used by software or applications running on computing device 900 to temporarily store information during program execution.

Storage devices 908, in some examples, also include one or more computer-readable storage media. Storage devices 908 may be configured to store larger amounts of information than volatile memory. Storage devices 908 may further be configured for long-term storage of information. In some examples, storage devices 908 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 900, in some examples, also includes one or more communication units 906. Computing device 900, in one example, utilizes communication units 906 to communicate with external devices via one or more networks, such as one or more wired/wireless/mobile networks. Communication units 906 may include a network interface card, such as an Ethernet card, an optical transceiver, a radio frequency transceiver, or any other type of device that can send and receive information. Other examples of such network interfaces may include 3G, 4G and WiFi radios. In some examples, computing device 900 uses communication unit 906 to communicate with an external device.

Computing device 900, in one example, also includes one or more user interface devices 910. User interface devices 910, in some examples, are configured to receive input from a user through tactile, audio, or video feedback. Examples of user interface devices(s) 910 include a presence-sensitive display, a mouse, a keyboard, a voice responsive system, video camera, microphone or any other type of device for detecting a command from a user. In some examples, a presence-sensitive display includes a touch-sensitive screen.

One or more output devices 912 may also be included in computing device 900. Output device 912, in some examples, is configured to provide output to a user using tactile, audio, or video stimuli. Output device 912, in one example, includes a presence-sensitive display, a sound card, a video graphics adapter card, or any other type of device for converting a signal into an appropriate form understandable to humans or machines. Additional examples of output device 912 include a speaker, a cathode ray tube (CRT) monitor, a liquid crystal display (LCD), or any other type of device that can generate intelligible output to a user.

Computing device 900 may include operating system 916. Operating system 916, in some examples, controls the operation of components of computing device 900. For example, operating system 916, in one example, facilitates the communication of one or more applications 922 and interconnection platform application 924 with processors 902, communication unit 906, storage device 908, input device 904, user interface device 910, and output device 912.

Application 922 and interconnection platform application 924 may also include program instructions and/or data that are executable by computing device 900. Interconnection platform application 924 may be configured to, when executed by computing device 900, provide functionality attributed to interconnection platforms described herein, including interconnection platform 103.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), Flash memory, a hard disk, a CD-ROM, a floppy disk, a cassette, magnetic media, optical media, or other computer readable media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
sending, by a container executed by processing circuitry of a host computing device and to a cloud exchange via an application programming interface exposed by an interconnection platform of the cloud exchange, container registration data for the container, the container registration data comprising a network address for the host computing device that executes the container and a container identifier for the container.

2. The method of claim 1, wherein the container identifier comprises one of a Transmission Control Protocol (TCP) port and a User Datagram Protocol (UDP) port.

3. The method of claim 1, wherein the container comprises a user-space instance from a plurality of user-space instances that share an operating system executing on the host computing device.

4. The method of claim 1, wherein the container executes at an enterprise network coupled to the cloud exchange to receive, via one or more virtual circuits, cloud services from one or more cloud service providers coupled to the cloud exchange.

5. The method of claim 4, wherein the sending the container registration data comprises sending the container registration data via the one or more virtual circuits.

6. The method of claim 1, wherein the container executes at a cloud service provider network coupled to the cloud exchange to provide, via one or more virtual circuits, a cloud service to one or more customers coupled to the cloud exchange.

7. The method of claim 6, wherein the sending the container registration data comprises sending the container registration data via the one or more virtual circuits.

8. The method of claim 1,
wherein the container comprises a first container, and
wherein the container registration data comprises first container registration data, the method further comprising:
receiving, by the first container from the cloud exchange, second container registration data for a second container; and
sending, by the first container to the second container based on the second container registration data, a data communication.

9. The method of claim 8,
wherein the first container executes at a first private network coupled to the cloud exchange, and
wherein the second container executes at a second private network coupled to the cloud exchange.

10. The method of claim 9,
wherein the first private network comprises an enterprise network for an enterprise customer of a cloud exchange provider for the cloud exchange, and
wherein the second private network comprises a cloud service for a cloud service provider customer of the cloud exchange provider for the cloud exchange.

11. The method of claim 9,
wherein the first private network comprises a cloud service for a first cloud service provider customer of a cloud exchange provider for the cloud exchange, and
wherein the second private network comprises a cloud service for a second cloud service provider customer of the cloud exchange provider for the cloud exchange.

12. The method of claim 8, further comprising:
determining, by the first container, a health of the second container at least in part by sending the data communication; and
redirecting application traffic from the second container to a third container in response to determining the health of second container.

13. A method comprising:
receiving, by a cloud exchange executed by processing circuitry of at least one computing device and from a container executing at a private network coupled to the cloud exchange, container registration data for the container, the container registration data comprising a network address for a host computing device that executes the container and a container identifier for the container; and
storing, by the cloud exchange, the container registration data.

14. The method of claim 13,
wherein the container comprises a first container, and
wherein the private network comprises a first private network, the method further comprising:
sending, by the cloud exchange to a second container executing at a second private network, the container registration data.

15. The method of claim 14, further comprising:
storing data indicating an association between the first container and the second container,
wherein sending the container registration data comprises sending the container registration data based on data indicating the association.

16. The method of claim 14, further comprising:
receiving, by the cloud exchange, an indication of the association from an enterprise.

17. The method of claim 13, further comprising:
determining, by the cloud exchange, a health of the container at least in part by sending a data communication to the container, the data communication including the container registration data.

18. The method of claim 17, further comprising:
in response to determining the container is not healthy, migrating the container to another private network.

19. The method of claim 17, further comprising:
in response to determining the container is not healthy, redirecting application traffic from the container to another container executing at a different private network.

20. The method of claim 17, further comprising:
storing, by the cloud exchange, state for the container indicating a state of one or more applications executing on the container,
wherein migrating the container to another private network comprising sending the state for the container to the another private network.

21. The method of claim 13, further comprising:
configuring, by the cloud exchange, a virtual circuit to the private network, wherein receiving the container registration data comprises receiving the container registration data via the virtual circuit.

22. The method of claim 13, further comprising:
sending, by the cloud exchange to the container based on the container registration data, a data communication.

23. A host computing device comprising:
at least one processor operably coupled to a memory;
a kernel configured for execution by the at least one processor; and
a container configured for execution by the kernel, wherein the container comprises a network module configured to output container registration data to a cloud exchange via an application programming interface exposed by an interconnection platform of the cloud exchange, the container registration data comprising a network address for the host computing device that executes the container and a container identifier for the container.

24. A cloud exchange comprising:
at least one computing device comprising processing circuitry;
at least one memory operably coupled to the processing circuitry;
a network; and
an interconnection platform configured for execution by the processing circuitry to configure the network to interconnect a plurality of private networks,
wherein the cloud exchange is configured for execution by the processing circuitry to receive, from a container executing at a private network of the plurality of private networks and via the interconnection platform, container registration data for the container, the container registration data comprising a network address for a host computing device that executes the container and a container identifier for the container, and
wherein the cloud exchange is configured for execution by the processing circuitry to store the container registration data in the memory.

25. A method comprising:
transmitting, by a first container of a first private network of a plurality of private networks coupled to a cloud exchange, the first container executed by processing circuitry of a host computing device, and to a router of the cloud exchange, a first data communication to request an indication of a health of a second container of a second private network of the plurality of private networks coupled to the cloud exchange; and
receiving, by the first container and from the router, a second data communication originated by the second container of the second private network of the plurality of private networks coupled to the cloud exchange, the second data communication indicating the health of the second container.

26. The method of claim 25, further comprising:
determining, by the first container based on the second data communication, the health of the second container; and
deploying, by the first container, a third container upon determining that the second container is unhealthy.

27. The method of claim 26, wherein:
the first data communication comprises an echo request packet;
the second data communication comprises an echo response packet; and
determining, by the first container, the health of the second container comprises determining, by the first container, that the second container is unhealthy if the first container does not receive the echo response packet within a pre-determined time.

28. The method of claim 25, wherein the first data communication comprises:
a container identifier of the second container; and
a network address for the host computing device executing at the second private network and hosting the second container.

* * * * *